(12) United States Patent (10) Patent No.: US 8,176,752 B2
Schiefelbein et al. (45) Date of Patent: May 15, 2012

(54) SILICA GLASS WITH SATURATED INDUCED ABSORPTION AND METHOD OF MAKING

(75) Inventors: Susan Lee Schiefelbein, Ithaca, NY (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 186 days.

(21) Appl. No.: 12/507,950

(22) Filed: Jul. 23, 2009

(65) Prior Publication Data

US 2011/0021339 A1 Jan. 27, 2011

(51) Int. Cl.
*C03B 19/00* (2006.01)
*C03C 3/06* (2006.01)

(52) U.S. Cl. ............................. 65/17.6; 65/17.5; 501/54

(58) Field of Classification Search .................... 501/54, 501/55, 56, 57; 65/17.4, 17.5
See application file for complete search history.

(56) References Cited

U.S. PATENT DOCUMENTS

| | | | |
|---|---|---|---|
| 6,619,073 B2 * | 9/2003 | Borrelli et al. | 65/30.1 |
| 7,064,093 B2 * | 6/2006 | Kuhn et al. | 501/54 |
| 2003/0119652 A1 | 6/2003 | Kuhn et al. | |
| 2005/0217318 A1 * | 10/2005 | Kuhn et al. | 65/32.3 |
| 2007/0004579 A1 | 1/2007 | Bookbinder et al. | |
| 2007/0105704 A1 * | 5/2007 | Bookbinder et al. | 501/54 |
| 2009/0110899 A1 | 4/2009 | Hrdina et al. | |
| 2009/0239732 A1 * | 9/2009 | Kuhn et al. | 501/43 |

FOREIGN PATENT DOCUMENTS

| | | |
|---|---|---|
| EP | 1340722 | 9/2003 |
| EP | 1586544 | 10/2005 |
| JP | 6166522 | 6/1994 |
| JP | 2002053331 | 2/2002 |
| JP | 2009190958 | 8/2009 |
| WO | 0192176 | 12/2001 |
| WO | 2007053733 | 5/2007 |

* cited by examiner

*Primary Examiner* — Jerry Lorengo
*Assistant Examiner* — Noah Wiese
(74) *Attorney, Agent, or Firm* — Robert P. Santandrea

(57) ABSTRACT

A silica glass article, such as a lens in a stepper/scanner system, having saturated induced absorption at wavelengths of less than about 250 nm. Saturated induced absorption is achieved by first removing Si—O defects in the silica glass by forming silicon hydride (SiH) at such defects, and loading the silica glass with hydrogen to react with E' centers formed by photolysis of SiH in the silica glass article. The silicon hydride is formed by loading the silica glass with molecular hydrogen at temperatures of at least 475° C. After formation of SiH, the silica glass is loaded with additional molecular hydrogen at temperatures of less than 475° C.

28 Claims, 2 Drawing Sheets

SILICA GLASS WITH SATURATED INDUCED ABSORPTION AND METHOD OF MAKING

BACKGROUND

Because of its transparency in the ultraviolet (248 nm) and deep ultraviolet (193 nm) ranges, silica glass is used extensively in the semiconductor industry as the lens material in stepper and stepper/scanner machines that use pulsed excimer lasers for transferring a mask pattern (at the top of the lens barrel) to a semiconducting wafer (at the bottom of the lens barrel). Consequently, the glass is exposed to high intensity, short wavelength radiation that can affect the refractive index and the transmission of the glass, both of which can affect image quality and wafer throughput. Controlling these dynamic processes is critical to maintaining stepper life, which is required to be many years, translating to hundreds of billions of pulses of laser radiation. A decrease in glass transmission, also referred to as induced absorption (IA), is frequently observed and typically increases linearly with the number of laser pulses, darkening the lens. Such IA behavior can potentially limit the lifetime of a stepper.

SUMMARY

A silica glass article, such as a lens in a stepper/scanner system, having saturated induced absorption at wavelengths of less than about 250 nm is provided. Saturated induced absorption is achieved by first removing weak Si—O bonds/defects in the silica glass by forming silicon hydride (SiH) at such defects, and subsequently loading the silica glass with hydrogen to react with E' centers formed by photolysis of SiH in the silica glass article. The silicon hydride is formed by loading the silica glass with molecular hydrogen at temperatures of at least 475° C. After formation of SiH, the silica glass is loaded with additional molecular hydrogen at temperatures of less than 475° C.

Accordingly, one aspect of the disclosure is to provide a method of making a silica glass article having a saturated induced absorption. The method comprises the steps of: providing a silica glass article having a plurality of Si—O defects that form E' centers when exposed to ultraviolet radiation having a wavelength of less than about 250 nm; removing at least a portion of the plurality of Si—O defects by forming SiH at each of the Si—O defects in the silica glass article; and providing molecular hydrogen to react with E' centers formed by photolysis of SiH in the silica glass article. The silica glass article has a saturated induced absorption at wavelengths of less than about 250 nm when exposed to ultraviolet radiation having a wavelength of less than about 250 nm.

Another aspect of the disclosure is to provide a method of making a silica glass article having a saturated induced absorption. The method comprises the steps of: providing a silica glass article; first loading the silica glass article at a first temperature with molecular hydrogen to form SiH, wherein the first temperature is at least about 475° C.; and loading the silica glass article with additional molecular hydrogen at a second temperature after loading at the first temperature, wherein the second temperature is less than about 475° C. The silica glass article has a saturated induced absorption at wavelengths of less than about 250 nm when exposed to ultraviolet radiation having a wavelength of less than about 250 nm.

Yet another aspect of the disclosure is to provide a method of saturating induced absorption within a silica glass article having a plurality of Si—O defects that form E' centers when exposed to ultraviolet radiation having a wavelength of less than about 250 nm. The method comprises the steps of: forming SiH at each of the Si—O defects to remove at least a portion of the plurality of Si—O defects in the silica glass article; and providing molecular hydrogen to react with E' centers formed by photolysis of the Si—H in the silica glass article when the silica glass article is exposed to ultraviolet radiation having a wavelength of less than about 250 nm. The silica glass article has a saturated induced absorption at wavelengths of less than about 250 nm.

A still further aspect of the disclosure is to provide a silica glass article. The silica glass article comprises up to about up to about $2\times10^{16}$ SiH species/cm$^3$ and a concentration of molecular hydrogen of up to about $2\times10^{18}$ H$_2$ molecules/cm$^3$. The silica glass article has a saturated induced absorption at wavelengths of less than about 250 nm when exposed to ultraviolet radiation having a wavelength of less than about 250 nm.

These and other aspects, advantages, and salient features will become apparent from the following detailed description, the accompanying drawings, and the appended claims.

DETAILED DESCRIPTION

Figure 1:
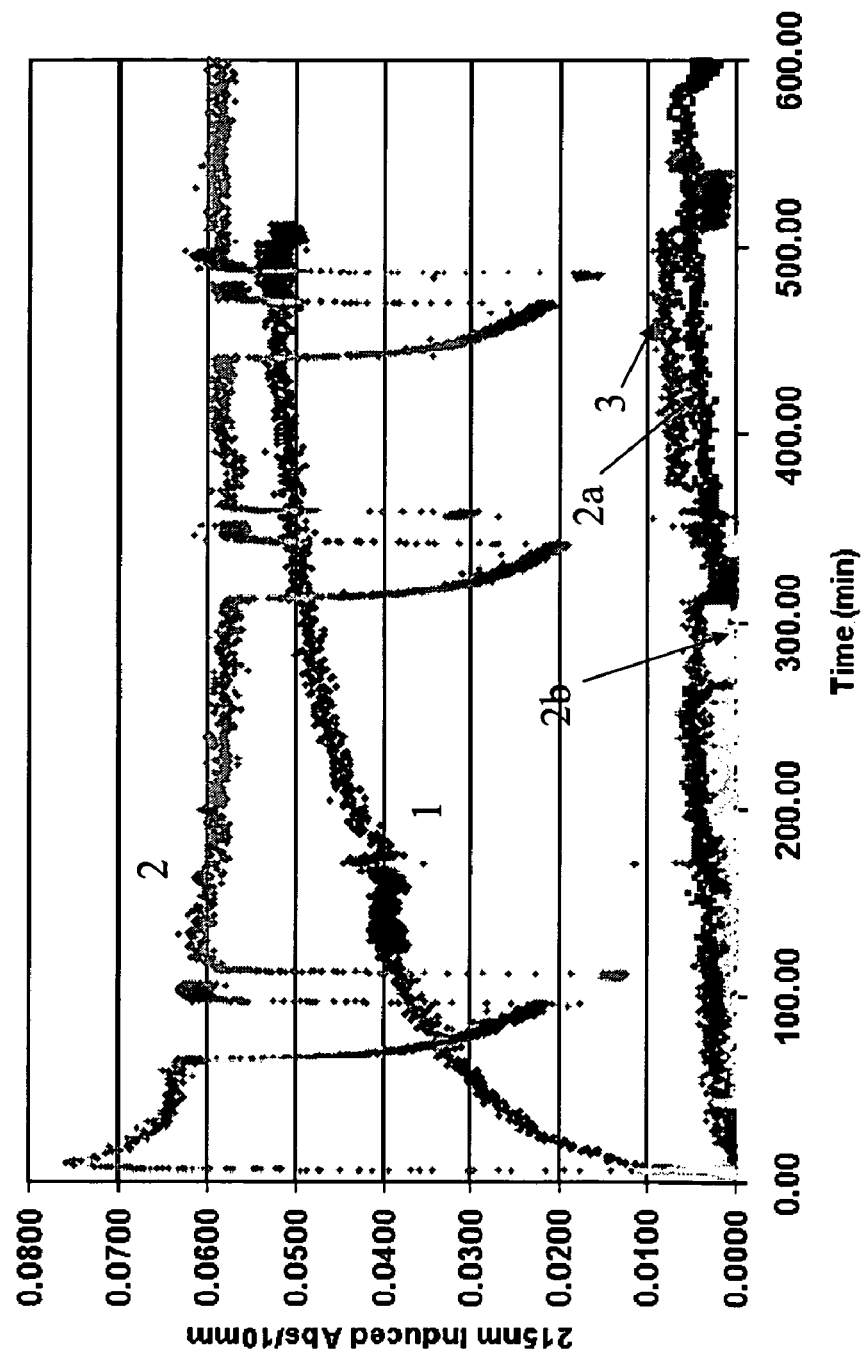
FIG. 1 is a plot of induced absorption at 215 nm for silica glass samples that were prepared using different hydrogen loading conditions.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements and combinations thereof, it is understood that the group may consist of any number of those elements recited, either individually or in combination with each other. Unless otherwise specified, a range of values, when recited, includes both the upper and lower limits of the range as well as any sub-ranges therebetween.

Referring to the drawings in general, it will be understood that the illustrations are for the purpose of describing particular embodiments and are not intended to limit the disclosure or appended claims thereto.

Due to its transparency in the ultraviolet (UV) (248 nm wavelength) and deep ultraviolet (193 nm wavelength) region of the spectrum, silica glass is used extensively as lens material in photolithographic steppers/scanners for the semiconductor industry. The lenses in such steppers/scanners are exposed to high intensity, short wavelength radiation generated, for example, by excimer lasers that can have an effect on the index of refraction and transmission of the silica glass. The decrease in transmission, referred to as induced absorption (IA), typically increases over time with continued exposure to laser radiation, leading to changes in image quality and throughput of semiconducting wafers through the stepper/scanner.

Silica glass consists of a network of silicon and oxygen atoms or ions in which oxygen atoms serve as bridges between silicon atoms. In the absence of molecular hydrogen ($H_2$), ultraviolet or deep ultraviolet radiation (hv) interacts with this silicon-oxygen network to form the E' species (≡Si.) and the non-bridging oxygen hole center (NBOHC) species (.OSi≡) according to the reaction ≡SiOSi≡+hv→≡Si.+.OSi≡.     (1)

E'     NBOHC

The reaction shown in equation (1) is also referred to herein as "lattice photolysis." The E' species has an absorption peak centered at about 215 nm in the UV portion of the spectrum. This peak is sufficiently broad so as to affect the transmission of silica glass at 193 nm, and therefore accounts for induced absorption observed at 193 nm. Non-bridging oxygen color centers absorb at 260 nm and affect IA of silica glass when exposed to 248 nm radiation. Without losing generality, only the E' species are discussed herein.

To mitigate induced absorption and formation of E' species shown in equation (1), Molecular hydrogen ($H_2$) is often incorporated into silica glass. Molecular hydrogen is typically added to the silica glass either by heating the glass to a predetermined temperature (or temperatures) in a hydrogen-containing atmosphere or by adding $H_2$ during glass making by combustion in those direct-to-glass processes known in the art. Molecular hydrogen is then available to react with the E' species formed by lattice photolysis to form a silicon hydride (SiH) according to the reaction $$\equiv Si \cdot + \frac{1}{2} H_2 \rightarrow \equiv SiH. \quad (2)$$

At 193 nm, silicon hydride absorbs less than the E' species formed by lattice photolysis (equation (1)), and is sufficiently low so as to have no significant adverse effect on transmission of the silica glass at this wavelength.

Silicon hydride also undergoes photolysis according to the reaction

≡SiH+hv→≡Si.+H     (3)

E' to generate an absorbing E' center, but the E' species formed by photolysis of silicon hydride react quickly with the nearby H atom according to the reverse reaction ≡Si.+H→≡SiH.     (4)

The rate of formation of E' centers by SiH photolysis (equation (3)) is orders of magnitude greater than the rate of formation of E' centers by lattice photolysis (equation (1)). The absorption produced by the photolysis of SiH to form E' centers therefore "saturates," or reaches an essentially constant steady state value, very quickly. The actual time required to reach this steady state depends on the fluence of radiation to which the silica glass is exposed. The rate of photolysis of SiH (equation (3)) is generally at least 10 times faster and, in some embodiments, 100 times faster than lattice photolysis (equation (1)).

Described herein are methods of making silica glass articles, such as an optical element for a photolithographic scanner/stepper, having a saturated induced absorption, a method of quickly (i.e., within 200,000 pulses at a fluence of 22 $mJ/cm^2 \cdot pulse$) saturating induced absorption within a silica glass article, and a silica glass article having saturated induced absorption. As used herein, the term "saturated induced absorption" refers to the steady state in which the induced absorption or transmission of a glass article, when exposed to radiation of a selected wavelength, achieves an essentially constant value (i.e., within 5% of a maximum value) or "saturates" and remains substantially unchanged with continued exposure to radiation at a given fluence. The methods and the silica glass described herein utilize the thermal formation of silicon hydride according to the reaction ≡SiOSi≡+$H_2$→≡SiH+HOSi≡,     (5)

to reduce the number of E' centers formed by lattice photolysis (equation (1)) and the reactivity of $H_2$ with E' centers formed by the photolysis of SiH according to equation (2). This is achieved by controlling the process of loading the silica glass with molecular hydrogen such that the photolysis of SiH, rather than lattice photolysis, is the dominant mechanism for formation of E' centers. This change in mechanism is accomplished by utilizing the temperature sensitivity of $H_2$ loading of the silica glass and the rate of SiH photolysis, described in equation (3).

As described herein, the silica glass article may, in one embodiment, be a synthetic fused silica glass article formed by those means known in the art, such as annealing, consolidating, or sintering performs. Such preforms can comprise silica soot or fused silica particles can be formed by vapor deposition processes that are known in the art, such as direct vapor deposition, outside vapor deposition, or the like or formed by sol-gel processes known in the art. Once formed into glass, the silica glass may be worked into the desired shape by processes such as, but not limited to, those thermal reflow, molding, grinding, and polishing methods known in the art.

As used herein, the terms "hydrogen molecule" and "$H_2$" refer to diatomic molecules, either individually or any collection, mixture, or assembly thereof, consisting of any combination of the isotopes of hydrogen (protium, deuterium, tritium), unless otherwise specified. Such isotopes can be present in concentrations that are greater than, equal to, or less than their respective natural isotopic abundances.

As used herein, the terms "hydroxyl" and "OH" refer to the diatomic anionic species, either individually or any collection, mixture, or assembly thereof, that consists of oxygen and any of the isotopes of hydrogen (protium, deuterium, tritium), unless otherwise specified. Such hydrogen isotopes can be present in concentrations that are greater than, equal to, or less than their respective natural isotopic abundances.

As used herein, the terms "silicon hydride," "SiH," and "SiH" refer to the diatomic species, either individually or any collection, mixture, or assembly thereof, that consists of silicon and any of the isotopes of hydrogen (protium, deuterium, tritium), unless otherwise specified. Such hydrogen isotopes can be present in concentrations that are greater than, equal to, or less than their respective natural isotopic abundances.

When referred to herein, other elements (e.g., Si, O) in any physical state are present as their naturally occurring mixtures of isotopes of such elements, unless otherwise specified.

A method of making a silica glass article having saturated induced absorption at wavelengths of less than about 250 nm, when exposed to radiation at wavelengths of less than about 250 nm, is provided. In a first step, a silica glass article is provided. The silica glass article can be prepared by those methods known in the art, including, but not limited to, those methods previously described hereinabove. The silica glass article includes a plurality of weak and/or strained Si—O—Si bonds, also referred to herein as "Si—O defects," that form E' centers through lattice photolysis via the reaction shown in equation (1) when exposed to ultraviolet radiation having a wavelength of less than about 250 nm. In particular embodiments, such Si—O defects form E' defects by lattice photolysis when exposed to ultraviolet radiation having a wavelength of either about 248 nm or about 193 nm.

In a second step, molecular hydrogen reacts with Si—O defects in the silica glass to form silicon hydride ("SiH" or "Si—H"). In one embodiment, SiH is "thermally" formed according to equation (5) in a first loading step, which comprises "loading" the silica glass article with molecular hydrogen—i.e., heating the silica glass at a predetermined temperature for a predetermined time to achieve a desired $H_2$ or SiH concentration within the silica glass. The loading time is chosen based on sample size, glass composition (e.g., the amount of OH and/or $O_2$ present in the glass), the desired SiH and $H_2$ profiles (e.g., flat profile across the diameter of the glass article or a gradient) and the desired SiH and $H_2$ concentrations. In one embodiment, the silica glass is loaded with a $H_2$ concentration that is sufficient to react and remove at least a portion of and, preferably, all of the Si—O defects from the silica glass. While the number of such Si—O defects cannot be measured directly, the concentration of such defects can be inferred from the concentration of E' centers formed by lattice photolysis in the silica glass in the absence of molecular $H_2$. The concentration of E' centers can be determined by those means known in the art such as, for example, electron paramagnetic resonance (EPR). The E' center concentration is generally in a range from about $10^{14}$ up to about $10^{16}$ centers/$cm^3$, with the actual concentration depending on the processes used to prepare the silica glass. The concentration of Si—O defects in silica glass would directly correspond to the concentration of E' centers, and would therefore be in a range from about $10^{14}$ up to about $10^{16}$ defects/$cm^3$. If the reaction of $H_2$ with Si—O defects described herein were to remove essentially all of the Si—O defects from the silica glass, the SiH concentration in the silicon glass would be approximately the same as that of the initial (i.e., before SiH formation) Si—O defect concentration, or in a range from about $1\times10^{14}$ SiH species/$cm^3$ up to about $1\times10^{16}$ SiH species/$cm^3$ and, in one embodiment, from about $1\times10^{15}$ SiH species/$cm^3$ up to about $2\times10^{16}$ SiH species/$cm^3$.

Silica glass is typically loaded with molecular hydrogen at temperatures less than or equal to about 800° C. and, in some embodiments, less than or equal to about 1000° C. The reactivity of the $SiO_2$ lattice with $H_2$ dictates the choice of temperature used in the hydrogen loading process. At temperatures greater than about 475° C., the $SiO_2$ lattice reacts with molecular hydrogen to form SiH, the photolysis of which leads to induced absorption (IA). The methods described herein recognize that SiH is a photolyzable species leading to induced absorption and that such IA quickly "saturates," or reaches a steady state.

In one embodiment, the step of reacting molecular hydrogen with Si—O defects to form silicon hydride includes subjecting the lattice of the silica glass article to a first loading step in which the glass article is "soaked" or loaded in a $H_2$-containing atmosphere at a temperature (also referred to herein as the "first temperature") of at least about 475° C. The loading of silica glass at temperatures of at least about 475° C. is also referred to herein as "hot loading." In one embodiment, the silica glass article is hot loaded at a first temperature in a range from about 475° C. up to about 1000° C. and, in another embodiment, in a range from about 475° C. up to about up to about 800° C. At these temperatures, it is believed that weak and/or strained bonds in the silica glass that are most susceptible to photolytic scission in the absence of $H_2$ (equation (1)) react with molecular hydrogen to yield SiH and SiOH species (equation (5)). The actual upper limit for hydrogen loading in the second step is dictated by the desire to react $H_2$ with only the Si—O defects. The higher the temperature, the more likely it is that $H_2$ will react with Si—O bonds that are not weak and/or strained, resulting in more extensive SiH formation than is desired. Reacting Si—O defects with $H_2$ effectively minimizes the lattice photolysis (equation (1)) that leads to progressively increasing induced absorption while maximizing the SiH photolysis (equation (3)), which rapidly achieves a steady state condition.

In the next step, additional molecular hydrogen is introduced into the silica glass under conditions where thermal SiH formation is not favored. When the silica glass is later exposed to laser radiation, the molecular hydrogen is available to react with E' centers that are formed by photolysis of SiH (equation (3)) to reform SiH in the silica glass article. The increase in $H_2$ concentration increases the rate of SiH formation (equation (2)), which in turn saturates the induced absorption of the silica glass. This scheme then yields saturated IA behavior with a controlled amount of induced absorption.

In one embodiment, the step of providing $H_2$ to react with E' centers formed by photolysis of SiH to reform SiH comprises incorporating molecular hydrogen in the silica glass in a second loading step. In the second step, the glass is loaded with $H_2$ at a temperature (also referred to herein as the "second temperature") of less than about 475° C. for a predetermined time. The loading of silica glass at temperatures of less than about 475° C. is also referred to herein as "cold loading." As with the hydrogen loading at higher temperatures, the loading time for the second loading step is selected based on sample size, glass composition, and the desired SiH and $H_2$ profiles and concentrations. In one embodiment, the second temperature is greater than or equal to about 300° C. and less than about 475° C. Even lower temperatures may be used for cold loading the silica glass. However, the use of such temperatures in this step would generally require so much time for loading the glass with the desired amount of $H_2$ as to be impractical. By cold loading the silica glass at a second temperature that is less than about 475° C., further "thermal" formation of SiH in the silica glass is minimized. In one embodiment, the silica glass is loaded in this step with molecular hydrogen to obtain a concentration of at least $1\times10^{16}$ $H_2$ molecules/$cm^3$. In another embodiment, the concentration of molecular hydrogen is in a range from about $1\times10^{16}$ $H_2$ molecules/$cm^3$ up to about $2\times10^{18}$ $H_2$ molecules/$cm^3$. In yet another embodiment, the $H_2$ concentration is in a range from about $1\times10^{16}$ $H_2$ molecules/$cm^3$ up to about $5\times10^{17}$ $H_2$ molecules/$cm^3$ and in a fourth embodiment, the $H_2$ concentration is in a range from about $1\times10^{16}$ $H_2$ molecules/$cm^3$ up to about $2\times10^{17}$ $H_2$ molecules/$cm^3$.

A method of saturating induced absorption in a silica glass article is also provided. The silica glass article contains a plurality of Si—O defects that absorb radiation having a wavelength of less than about 250 nm such as, for example, 248 nm or 193 nm. The Si—O defects are first removed from the silica glass by forming Si—H bonds at each of the Si—O defects. In one embodiment, the Si—H bonds are formed by loading the silica glass with molecular hydrogen at a first temperature of at least 475° C., as described previously hereinabove. Next, molecular hydrogen is provided to react with E' centers (equation (2)) that are later formed by photolysis of SiH, which occurs according to equation (3), to reform SiH in the silica glass article. In one embodiment, this step comprises incorporating molecular hydrogen in the silica glass by loading the glass with $H_2$ at a second temperature of less than about 475° C. and, in one embodiment, at a second temperature that is in a range from about 300° C. up to about 475° C. The induced absorption produced by E' centers formed by SiH photolysis reaches a steady state value very quickly and thus "saturates," or reaches an essentially constant value.

In one embodiment, the methods described herein provide a saturated induced absorption at a wavelength of 215 nm of less than about 0.01/cm after exposure to 200,000 pulses of 193 nm laser radiation at a fluence of 22 mJ/cm²·pulse. In another embodiment, the silica glass article has a saturated induced absorption of less than about 0.005/cm after exposure to 200,000 pulses of 193 nm laser radiation at a fluence of 22 mJ/cm²·pulse and, in yet another embodiment, less than about 0.002/cm after exposure to 200,000 pulses of 193 nm laser radiation at a fluence of 22 mJ/cm²·pulse.

It will be appreciated by those skilled in the art that the actual loading times and temperatures used for the steps of reacting molecular hydrogen with Si—O defects to form SiH and providing additional $H_2$ to react with E' centers formed by photolysis of SiH to reform SiH according to the above methods depend in part on the geometry and composition of the silica glass article. In particular, the hydroxyl (OH) content of the silica glass affects the extent of thermal hydride formation in the glass. For a given hydrogen concentration or loading time and temperature of the silica glass, lower OH concentrations result in a higher concentration of thermally formed SiH. In contrast, silica glass articles having higher hydroxyl contents will contain lower amounts of thermally formed SiH when loaded with $H_2$ under the same conditions.

A silica glass article having a saturated induced absorption at wavelengths below about 250 nm when exposed to ultraviolet radiation at wavelengths of less than about 250 nm is also provided. The silica glass article comprises up to about up to about $2 \times 10^{16}$ Si—H bonds/cm³ and at least about $1 \times 10^{16}$ $H_2$ molecules/cm³. In one embodiment, the concentration of molecular hydrogen is in a range from about $1 \times 10^{16}$ $H_2$ molecules/cm³ up to about $1 \times 10^{18}$ $H_2$ molecules/cm³. In yet another embodiment, the $H_2$ concentration is in a range from about $1 \times 10^{16}$ $H_2$ molecules/cm³ up to about $5 \times 10^{17}$ $H_2$ molecules/cm³ and in a fourth embodiment, the $H_2$ concentration is in a range from about $1 \times 10^{16}$ $H_2$ molecules/cm³ up to about $2 \times 10^{17}$ $H_2$ molecules/cm³. The silica glass article may further comprise up to 100 ppm OH by weight and, in one embodiment, less than about 10 ppm OH by weight.

The silica glass article, in one embodiment, has a saturated induced absorption of less than about 0.01/cm after exposure to 200,000 pulses of 193 nm laser radiation at a fluence of 22 mJ/cm²·pulse. In another embodiment, the silica glass article has a saturated induced absorption of less than about 0.005/cm after exposure to 200,000 pulses of 193 nm laser radiation at a fluence of 22 mJ/cm²·pulse and, in yet another embodiment, less than about 0.002/cm after exposure to 200,000 pulses of 193 nm laser radiation at a fluence of 22 mJ/cm²·pulse.

The silica glass article is prepared by the methods described herein. A silica glass article is first provided, and can be prepared by those methods known in the art that are previously mentioned hereinabove. Molecular hydrogen is then reacted with Si—O defects in the silica glass article to form silicon hydride. In one embodiment, SiH is formed according to equation (2) by "loading" the silica glass article with molecular hydrogen at a first temperature that is at least about 475° C. and, in one embodiment, at a first temperature that is between about 475° C. and about 1000° C. Additional molecular hydrogen is then provided to react with E' centers (equation (2)) that are later formed by photolysis of SiH, which occurs according to equation (3), to reform SiH in the silica glass article. In one embodiment, this step comprises incorporating molecular hydrogen in the silica glass by cold loading the glass with $H_2$ at a second temperature of less than about 475° C. and, in one particular embodiment, at a second temperature that is greater than or equal to about 300° C. and less than about 475° C. The induced absorption produced by E' centers formed by SiH photolysis reaches a steady state value very quickly and thus "saturates," or reaches an essentially constant value.

EXAMPLES

The following examples illustrate the features and advantages of the present disclosure and in are no way intended to limit the disclosure or appended claims thereto.

Example 1

Preparation of Silica Glass

A silica glass sample having dimensions of 3 cm×1.5 cm×12 cm, an OH concentration that is below detection limits (0.1 ppm by weight) and an $O_2$ concentration that is assumed to be about $5 \times 10^{15}$ $O_2$ molecules/cm³ was provided. Using a two dimensional diffusion/reaction model that uses the finite difference method to calculate the hydrogen concentration for 1, 2, or 3 dimensional numerical grids as a function of time as a guide, the silica glass was hot loaded with molecular hydrogen at 700° C. in a forming gas (~5% $H_2$ in $N_2$) for 70 hours. Hot loading yielded a relatively flat hydrogen concentration profile, as determined by Raman spectroscopy, with 95% of the ambient $H_2$ located at the center of the samples. The SiH concentration after loading was calculated to be about $1 \times 10^{14}$ SiH species/cm³. After hot loading, the glass was cold-loaded at 350° C. for 52 days. Hydrogen and SiH concentrations, measured after hot loading and after cold loading, are listed in Table 1. Cold loading increased the $H_2$ content of the glass, but did not increase the SiH content. The SiH concentration reported in Table 1 is expressed in arbitrary units rather than in species/cm³.

TABLE 1

$H_2$ and SiH concentrations after hot loading and cold loading silica glass.

| | Position | $H_2$ (molecules/cm³) | SiH (arbitrary units) |
|---|---|---|---|
| After hot loading | Center | $8 \times 10^{16}$ | 0.11 |
| | Edge | $1 \times 10^{17}$ | 0.18 |
| After cold loading | Center | $5.6 \times 10^{17}$ | 0.12 |
| | Edge | $4.8 \times 10^{17}$ | 0.18 |

Example 2

Induced Absorption Measurements

Induced absorption for silica glass samples that were prepared using different $H_2$ loading conditions are compared in FIG. 1. The induced absorption/cm at 215 nm is plotted for each sample as a function of exposure time, expressed in minutes, to 140 pulses/second of an ArF laser having a fluence of 22 mJ/cm²·pulse. All glasses contained approximately 60 ppm OH. The IA of silica glass sample that was not loaded with $H_2$ (sample 1 in FIG. 1) increases steadily with increasing exposure to radiation. The sample that was loaded with $H_2$ at 800° C. (sample 2 in FIG. 1) exhibits an induced absorption or darkening rate that is initially fast, and then essentially level or constant after roughly 60 minutes of exposure (corresponding to approximately $0.5 \times 10^6$ pulses). Sample 2 has a greater IA (about 0.0600/cm) when compared to the other glasses shown in FIG. 1. Two pieces taken from sample 2 were subsequently cold loaded with $H_2$ at lower temperatures (<475° C., as described herein). Sample 2a was cold loaded at 350° C. in a second step to a final $H_2$ concentration of $1 \times 10^{17}$ molecules/cm$^3$. Sample 2b was cold-loaded in a second step at 350° C. under 30 atmospheres of $H_2$ to a final $H_2$ concentration of about $2 \times 10^{19}$ molecules/cm$^3$. Samples 2a and 2b both exhibited the same saturating behavior as that observed for sample 2, but with much lower induced absorption levels. Sample 5, was not hot loaded, but instead was cold loaded with molecular hydrogen by heating the sample at 350° C. under 30 atm $H_2$, exhibits a slowly increasing IA that is greater than the induced absorption of both samples 2a and 2b, which were loaded using the methods (i.e., hot loaded and then cold loaded) described herein.

Figure 2:
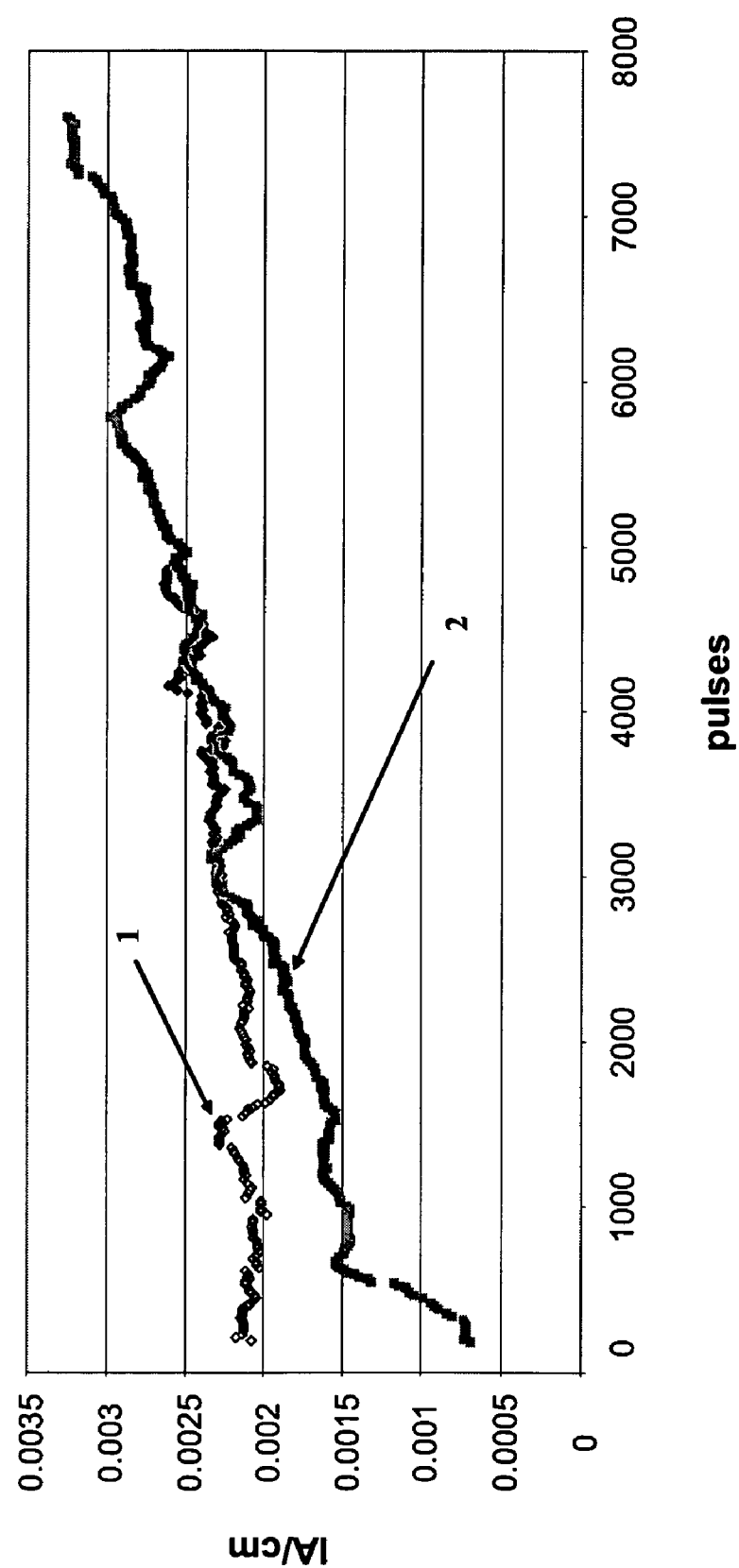
FIG. 2 is a plot of induced absorption at 193 nm with an exposure fluence of 500 µJ/cm$^2$·pulse for silica glass samples.

Induced absorption data obtained at 193 nm at an exposure fluence of 500 µJ/cm$^2$·pulse at 193 nm for (1) silica glass prepared according to the methods described herein and having a $H_2$ concentration of $1.9 \times 10^{18}$ molecules/cm$^3$; and (2) silica glass that was conventionally loaded with hydrogen at about 350° C. and having a $H_2$ concentration of $1.2 \times 10^{17}$ molecules/cm$^3$ are shown in FIG. 2. The glass prepared according to the methods described herein (line 1 in FIG. 2) exhibits relatively flat induced absorption compared to the conventionally loaded glass (line 2 in FIG. 2).

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method of making a silica glass article, the silica glass article having a saturated induced absorption, the method comprising the steps of:
   a. providing a silica glass article, the silica glass article having a plurality of Si—O defects that form E' centers when exposed to ultraviolet radiation having a wavelength of less than about 250 nm;
   b. providing molecular hydrogen to remove at least a portion of the plurality of Si—O defects by forming SiH at each of the Si—O defects in the silica glass article; and
   c. providing molecular hydrogen to react with E' centers formed by photolysis of SiH in the silica glass article before exposing the silica glass article to ultraviolet or deep ultraviolet radiation, wherein the silica glass article has a saturated induced absorption at wavelengths of less than about 250 nm when exposed to ultraviolet radiation having a wavelength of less than about 250 nm.

2. The method according to claim 1, wherein the silica glass article has a saturated induced absorption of less than about 0.01/cm after exposure to 200,000 pulses of 193 nm laser radiation at a fluence of 22 mJ/cm$^2$·pulse.

3. The method according to claim 2, wherein the saturated induced absorption is less than about 0.005/cm after exposure to 200,000 pulses of 193 nm laser radiation at a fluence of 22 mJ/cm$^2$·pulse.

4. The method according to claim 3, wherein the saturated induced absorption is less than about 0.002/cm after exposure to 200,000 pulses of 193 nm laser radiation at a fluence of 22 mJ/cm$^2$·pulse.

5. The method according to claim 1, wherein the step of forming SiH at the Si—O defects comprises a first loading step, the first loading step comprising heating the silica glass article at a first temperature of at least about 475° C. in a hydrogen-containing atmosphere.

6. The method according to claim 5, wherein the first temperature is in a range from about 475° C. up to about 1000° C.

7. The method according to claim 5, wherein the silica glass article has a SiH concentration after the first loading step in a range from about $1 \times 10^{14}$ SiH species/cm$^3$ up to about $2 \times 10^{16}$ SiH species/cm$^3$.

8. The method according to claim 1, wherein the step of providing molecular hydrogen to react with E' centers formed by photolysis of SiH in the silica glass article comprises a second loading step, the second loading step comprising loading the silica glass article with molecular hydrogen.

9. The method according to claim 8, wherein the second loading step comprises heating the silica glass article at a second temperature of less than about 475° C. in a hydrogen-containing atmosphere.

10. The method according to claim 9, wherein the second temperature is less than about 475° C. and greater than or equal to about 300° C.

11. The method according to claim 8, wherein the second loading step comprises loading the silica glass article with molecular hydrogen to a concentration of at least $1 \times 10^{16}$ $H_2$ molecules/cm$^3$.

12. The method according to claim 11, wherein the concentration of molecular hydrogen is less than about $2 \times 10^{18}$ $H_2$ molecules/cm$^3$.

13. The method according to claim 1, wherein induced absorption of the E' centers produced by SiH photolysis reaches a steady state value and saturates the induced absorption of the silica glass article at less than about 0.01/cm after exposure to 200,000 pulses of 193 nm laser radiation at a fluence of 22 mJ/cm$^2$·pulse.

14. A method of making a silica glass article, the silica glass article having a saturated induced absorption, the method comprising the steps of:
   a. providing a silica glass article;
   b. loading the silica glass article at a first temperature with molecular hydrogen to form SiH, wherein the first temperature is at least about 475° C.; and
   c. loading the silica glass article with molecular hydrogen at a second temperature after loading at the first temperature and before exposing the silica glass article to ultraviolet or deep ultraviolet radiation, wherein the second temperature is less than about 475° C., to form a silica glass article having a saturated induced absorption at wavelengths of less than about 250 nm when exposed to ultraviolet radiation having a wavelength of less than about 250 nm.

15. The method according to claim 14, wherein the step of loading the silica glass article with molecular hydrogen at a second temperature comprises providing molecular hydrogen to react with E' centers formed by photolysis of the SiH in the silica glass article.

16. The method according to claim 15, wherein induced absorption of the E' centers produced by photolysis of the SiH reaches a steady state value and saturates the induced absorption at less than about 0.01/cm after exposure to 200,000 pulses of 193 nm laser radiation at a fluence of 22 mJ/cm$^2$·pulse.

17. The method according to claim 14, wherein the silica glass article has a SiH concentration in a range from about $1 \times 10^{14}$ SiH species/cm$^3$ up to about $2 \times 10^{16}$ SiH species/cm$^3$ after loading with molecular hydrogen at the second temperature.

18. The method according to claim 14, wherein loading the silica glass article at a first temperature with molecular hydrogen to form SiH comprises removing at least a portion of Si—O defects in the silica glass article.

19. A method of saturating induced absorption within a silica glass article having a plurality of Si—O defects that form E' centers when exposed to ultraviolet radiation having a wavelength of less than about 250 nm, the method comprising the steps of:
 a. forming SiH at each of the Si—O defects to remove art least a portion of the plurality of Si—O defects in the silica glass article; and
 b. providing molecular hydrogen to react with E' centers formed by photolysis of the SiH in the silica glass article when the silica glass article is exposed to ultraviolet radiation having a wavelength of less than about 250 nm, wherein the silica glass article has a saturated induced absorption at wavelengths of less than about 250 nm, wherein the molecular hydrogen is provided before exposing the silica glass article to ultraviolet or deep ultraviolet radiation.

20. The method of claim 19, wherein the step of forming SiH at each of the Si—O defects to remove art least a portion of the plurality of Si—O defects comprises a first loading step, the first loading step comprising heating the silica glass article at a first temperature of at least about 475° C. in the presence of a hydrogen-containing atmosphere.

21. The method of claim 18, wherein the step of providing molecular hydrogen to react with E' centers formed by photolysis of the SiH in the silica glass article further comprises a second loading step, the second loading step comprising loading molecular hydrogen into the silica glass article by heating the silica glass article at a second temperature of less than about 475° C. in the presence of a hydrogen-containing atmosphere.

22. The method of claim 18, wherein the saturated induced absorption is less than about 0.01/cm after exposure to 200,000 pulses of 193 nm laser radiation at a fluence of 22 mJ/cm²·pulse.

23. A silica glass article, the silica glass article comprising up to about up to about $2 \times 10^{16}$ SiH species/cm³ and a concentration of molecular hydrogen of in a range from $7 \times 10^{16}$ $H_2$ molecules/cm³ to about $2 \times 10^{18}$ $H_2$ molecules/cm³, wherein the silica glass article, when exposed to ultraviolet radiation having a wavelength of less than about 250 nm, has a saturated induced absorption at wavelengths of less than about 250 nm.

24. The silica glass article of claim 23, wherein the saturated induced absorption is less than about 0.01/cm after exposure to 200,000 pulses of 193 nm laser radiation at a fluence of 22 mJ/cm²·pulse.

25. The silica glass article of claim 23, wherein the silica glass article is first loaded at a first temperature of at least about 475° C. with molecular hydrogen to form SiH, and then loaded with molecular hydrogen at a second temperature of less than about 475° C.

26. The method of claim 1, wherein the saturated induced absorption varies by less than about 5% from a maximum value.

27. The method of claim 14, wherein the saturated induced absorption varies by less than about 5% from a maximum value.

28. The method of claim 14, wherein the saturated induced absorption varies by less than about 5% from a maximum value.

* * * * *